(12) United States Patent  
Komori et al.

(10) Patent No.: US 11,713,714 B2  
(45) Date of Patent: Aug. 1, 2023

(54) GAS TURBINE ENGINE

(71) Applicant: KAWASAKI JUKOGYO KABUSHIKI KAISHA, Kobe (JP)

(72) Inventors: Shinsaku Komori, Kobe (JP); Takafumi Fujii, Kobe (JP); Tatsuya Okuwa, Kobe (JP); Hikaru Maesato, Kobe (JP)

(73) Assignee: KAWASAKI JUGKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/770,314

(22) PCT Filed: Oct. 20, 2020

(86) PCT No.: PCT/JP2020/039454  
§ 371 (c)(1),  
(2) Date: Apr. 20, 2022

(87) PCT Pub. No.: WO2021/079890  
PCT Pub. Date: Apr. 29, 2021

(65) Prior Publication Data  
US 2022/0389868 A1    Dec. 8, 2022

(30) Foreign Application Priority Data  
Oct. 21, 2019    (JP) ................. 2019-191928

(51) Int. Cl.  
*F02C 7/06* (2006.01)  
*F02C 6/08* (2006.01)  
(Continued)

(52) U.S. Cl.  
CPC .............. *F02C 7/06* (2013.01); *F02C 6/08* (2013.01); *F16N 7/32* (2013.01); *F01D 25/20* (2013.01);  
(Continued)

(58) Field of Classification Search  
CPC ...... F02C 7/06; F02C 6/08; F16N 7/32; F16N 2210/02; F16N 2210/14; F05D 2260/606;  
(Continued)

(56) References Cited

U.S. PATENT DOCUMENTS

2019/0316488 A1* 10/2019 Menczykalski .......... F01M 1/02  
2020/0191054 A1*  6/2020 Parnin ..................... F01D 25/20

FOREIGN PATENT DOCUMENTS

JP    2001-165390 A    6/2001

* cited by examiner

*Primary Examiner* — Yi-Kai Wang  
(74) *Attorney, Agent, or Firm* — Sughrue Mion, PLLC

(57) ABSTRACT

A gas turbine engine includes: a main passage through which compressed air extracted from a compressor is guided to a bearing; and an oil supply device that includes an oil tank storing oil and supplies the oil to the main passage through which the compressed air flows to generate oil mist. The oil supply device includes: a pressure reducer disposed at the main passage; a bypass passage that bypasses the pressure reducer and connects an upstream passage and a downstream passage; a holding chamber disposed at the bypass passage and having a predetermined volume; a switching mechanism that permits or blocks communication between the holding chamber and the oil tank, communication between the holding chamber and the upstream passage, and communication between the holding chamber and the downstream passage; and a controller that controls the switching mechanism.

5 Claims, 3 Drawing Sheets

(51) Int. Cl.
    *F16N 7/32* (2006.01)
    *F01D 25/20* (2006.01)
(52) U.S. Cl.
    CPC .... *F05D 2260/606* (2013.01); *F05D 2260/98* (2013.01)
(58) Field of Classification Search
    CPC ........... F05D 2260/98; F05D 2260/601; F05D 2270/00; F05D 25/18; F01D 25/00; F01D 25/16
    USPC ....................................................... 415/110
    See application file for complete search history.

GAS TURBINE ENGINE

CROSS REFERENCE TO RELATED APPLICATIONS

This application is a National Stage of International Application No. PCT/JP2020/039454, filed Oct. 20, 2020, claiming priority to Japanese Patent Application No. 2019-191928, filed Oct. 21, 2019, the entire contents of which are incorporated herein by reference.

TECHNICAL FIELD

One aspect of the present disclosure relates to a gas turbine engine utilized in a flying object, an aircraft, or the like.

BACKGROUND ART

PTL 1 discloses a mechanism that supplies oil mist to a bearing by air extracted from a compressor in a gas turbine engine of a flying object. This oil mist supply mechanism includes an oil mist generator and an oil tank. When the flying object flies, compressed air extracted from the compressor of the engine is introduced to the oil mist generator. Oil is sucked from the oil tank into the oil mist generator by the compressed air introduced to the oil mist generator, and the oil mist is generated. The generated oil mist is supplied to the bearing.

CITATION LIST

Patent Literature

PTL 1: Japanese Laid-Open Patent Application Publication No. 2001-165390

SUMMARY OF INVENTION

Technical Problem

In the above-described oil mist supply mechanism, the amount of oil sucked from the oil tank to the oil mist generator fluctuates in accordance with the pressure of the air extracted from the compressor. Therefore, the amount of oil supplied to the bearing may be excessive or insufficient.

Solution to Problem

A gas turbine engine according to one aspect of the present disclosure is a gas turbine engine in which a compressor, a combustor, and a turbine are arranged so as to be lined up along a rotating shaft. The gas turbine engine includes: a casing accommodating the compressor, the combustor, and the turbine; a bearing arranged inside the casing; a main passage through which compressed air extracted from the compressor is guided to the bearing; and an oil supply device that includes an oil tank storing oil and supplies the oil to the main passage through which the compressed air flows to generate oil mist. The oil supply device includes a pressure reducer that is disposed at the main passage and makes pressure in a downstream passage of the main passage lower than pressure in an upstream passage of the main passage, the downstream passage being a portion located downstream of the pressure reducer, the upstream passage being a portion located upstream of the pressure reducer, a bypass passage that bypasses the pressure reducer and connects the upstream passage and the downstream passage, a holding chamber disposed at the bypass passage and having a predetermined volume, a switching mechanism that permits or blocks communication between the holding chamber and the oil tank, communication between the holding chamber and the upstream passage, and communication between the holding chamber and the downstream passage, and a controller that controls the switching mechanism. The controller controls the switching mechanism such that the switching mechanism switches to a first state, a second state, and a third state in this order, the first state being a state where the communication between the holding chamber and the oil tank is blocked, the communication between the holding chamber and the upstream passage is blocked, and the communication between the holding chamber and the downstream passage is permitted, the second state being a state where the communication between the holding chamber and the oil tank is permitted, the communication between the holding chamber and the upstream passage is blocked, and the communication between the holding chamber and the downstream passage is blocked, the third state being a state where the communication between the holding chamber and the oil tank is blocked, the communication between the holding chamber and the upstream passage is permitted, and the communication between the holding chamber and the downstream passage is permitted.

According to the above configuration, when the switching mechanism is in the first state, the holding chamber communicates with the downstream passage, and therefore, the pressure in the holding chamber becomes equal to the pressure in the downstream passage which has been reduced in pressure by the pressure reducer. Next, when the switching mechanism switches to the second state, the holding chamber communicates with the oil tank, and therefore, a part of the oil in the oil tank flows into the holding chamber which has been reduced in pressure when the switching mechanism is in the first state. Next, when the switching mechanism switches to the third state, the holding chamber communicates with both the upstream passage and the downstream passage, and therefore, the compressed air supplied from the compressor flows from the upstream passage through the bypass passage to the downstream passage. At this time, the oil and the compressed air in the holding chamber are mixed to generate the oil mist, and the generated oil mist is supplied to the bearing through the downstream passage.

The amount of oil supplied to the main passage in a process in which the switching mechanism switches from the first state to the third state becomes an amount corresponding to the volume of the holding chamber. Therefore, according to the above configuration, the controller repeatedly switches the state of the switching mechanism, and with this, the amount of oil supplied to the bearing can be maintained constant.

Advantageous Effects of Invention

According to one aspect of the present disclosure, the amount of oil supplied to a bearing can be maintained constant in a gas turbine engine including a lubricator that supplies oil mist to the bearing by air extracted from a compressor.

DESCRIPTION OF EMBODIMENTS

Hereinafter, embodiments will be described with reference to the drawings.

Figure 1:
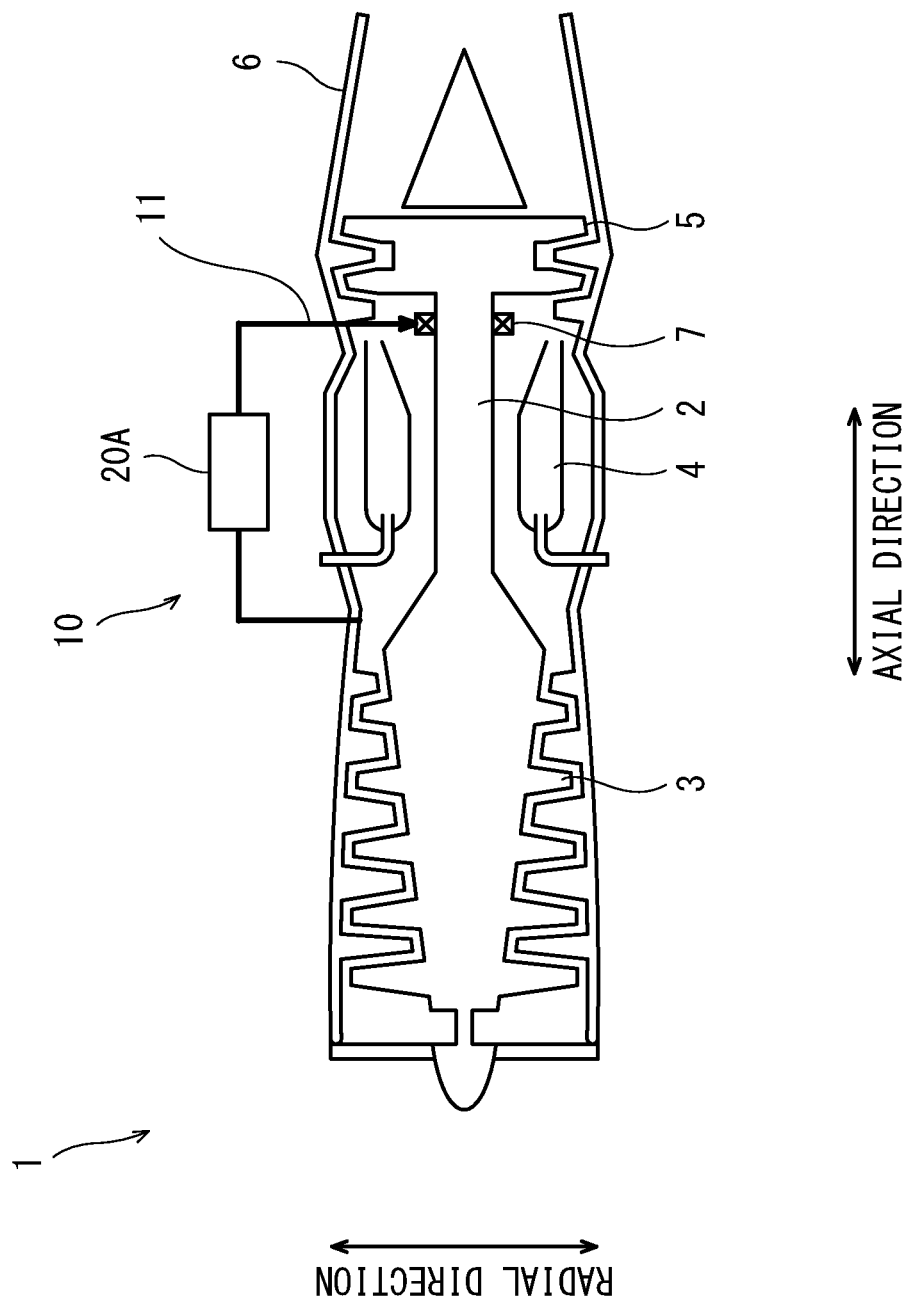
FIG. 1 is a schematic diagram of a gas turbine engine according to one embodiment of one aspect of the present disclosure.

FIG. 1 is a schematic diagram of a gas turbine engine 1 according to one embodiment of one aspect of the present disclosure. The gas turbine engine 1 includes a rotating shaft 2, a compressor 3, a combustor 4, a turbine 5, and a casing 6. The rotating shaft 2 extends in a front-rear direction of the gas turbine engine 1. The compressor 3, the combustor 4, and the turbine 5 are lined up in this order from a front side to a rear side along the rotating shaft 2. The casing 6 is a tubular object having an axis that coincides with a rotation axis of the rotating shaft 2. The casing 6 accommodates the rotating shaft 2, the compressor 3, the combustor 4, and the turbine 5. In the gas turbine engine 1, air introduced from an outside is compressed in the compressor 3 and is guided to the combustor 4, and fuel is combusted in the combustor 4 together with the compressed air. Energy of the obtained high-temperature, high-pressure combustion gas is taken out as rotational power by the turbine 5.

There are various types of gas turbine engines, and the type of the gas turbine engine 1 is not especially limited. The compressor 3 may be an axial flow compressor, a centrifugal compressor, or a combination of the axial flow compressor and the centrifugal compressor. The number of stages of the compressor 3 and the number of stages of the turbine 5 are arbitrary. Moreover, the gas turbine engine 1 may be a single-shaft gas turbine engine or a two-shaft gas turbine engine. The gas turbine engine 1 may be a turbofan engine or a turbojet engine.

The rotating shaft 2 is supported by bearings 7. The bearings 7 are arranged in an internal space (radially inner side) of the casing 6 along the rotating shaft 2. In FIG. 1, among the bearings 7, only the bearing 7 that is located downstream of the combustor 4 and supports the rotating shaft 2 is shown, and the other bearings 7 are not shown.

The gas turbine engine 1 includes an oil mist supply system 10 that supplies oil mist to the bearings 7. The oil mist supply system 10 supplies the oil mist to the bearings 7 by the pressure of the compressed air extracted from the compressor 3. The oil mist supply system 10 includes: a main passage 11 through which the compressed air extracted from the compressor 3 is guided to the bearings 7; and an oil supply device 20A that supplies oil to the main passage 11 through which the compressed air flows.

The main passage 11 guides the compressed air, extracted from the compressor 3, to the bearings 7. The main passage 11 can be comprised of, for example, a pipe, a casing, or a housing. In the following description, "upstream" and "downstream" in the main passage 11 respectively denote upstream and downstream in a direction in which a fluid flows in the main passage 11 from the compressor 3 toward the bearing 7.

The oil supply device 20A includes an oil tank 30 that stores the oil. The oil supply device 20A supplies the oil to the main passage 11 through which the compressed air flows. With this, the compressed air extracted from the compressor 3 and the oil supplied by the oil supply device 20A are mixed with each other to generate the oil mist. The generated oil mist is supplied to the bearings 7 through the main passage 11 by the pressure of the compressed air extracted from the compressor 3.

Figure 2:
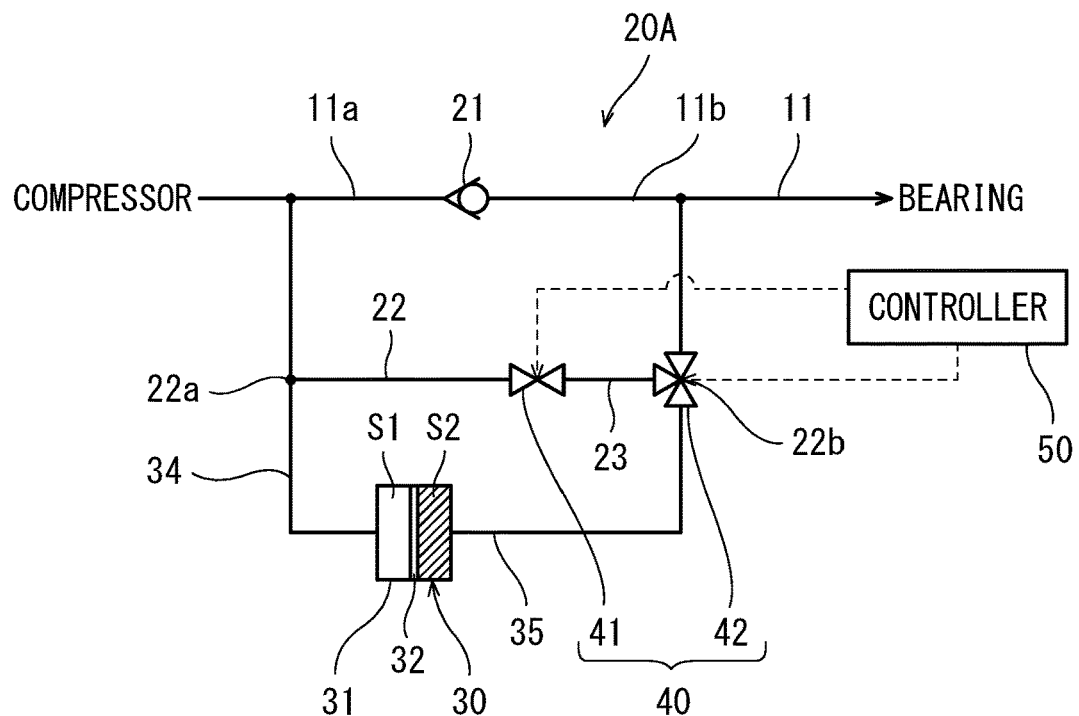
FIG. 2 is a schematic diagram of an oil supply device shown in FIG. 1.

FIG. 2 is a schematic diagram of the oil supply device 20A shown in FIG. 1. The oil supply device 20A includes a pressure reducer 21, a bypass passage 22, the oil tank 30, a switching mechanism 40, and a controller 50.

The pressure reducer 21 is disposed at the main passage 11. Hereinafter, a portion of the main passage 11 which portion is located upstream of the pressure reducer 21 is referred to as an "upstream passage 11a," and a portion of the main passage 11 which portion is located downstream of the pressure reducer 21 is referred to as a "downstream passage 11b." The pressure reducer 21 makes the pressure in the downstream passage 11b lower than the pressure in the upstream passage 11a. In the present embodiment, adopted as the pressure reducer 21 is a check valve that prevents the compressed air from flowing from the downstream passage 11b to the upstream passage 11a.

The bypass passage 22 bypasses the pressure reducer 21 and connects the upstream passage 11a and the downstream passage 11b. The bypass passage 22 is comprised of a pipe but may be comprised of a casing, a housing, or the like. In the following description, "upstream" and "downstream" in the bypass passage 22 respectively denote upstream and downstream in a direction in which a fluid flows in the bypass passage 22 from the upstream passage 11a to the downstream passage 11b.

A holding chamber 23 having a predetermined volume is disposed at the bypass passage 22. The holding chamber 23 temporarily holds a certain amount of oil guided from the oil tank 30. In the present embodiment, the holding chamber 23 is a part of the pipe of which the bypass passage 22 is comprised. More specifically, the holding chamber 23 is a portion of the bypass passage 22 which portion is located between a below-described first control valve 41 and a below-described second control valve 42. Details of the supply of the oil to the holding chamber 23 and the discharge of the oil from the holding chamber 23 will be described later.

In the present embodiment, the oil tank 30 includes: a casing 31 having an internal space; and a divider 32 that divides the internal space of the casing 31 into an air chamber S1 and an oil chamber S2.

A tank inlet passage 34 is connected to the air chamber S1. The tank inlet passage 34 guides a part of the compressed air, which flows through the upstream passage 11a, to the air chamber S1. In the present embodiment, one of end portions of the tank inlet passage 34 is connected to the air chamber S1, and the other end portion of the tank inlet passage 34 is connected to a portion of the bypass passage 22 but may be directly connected to the upstream passage 11a instead of the bypass passage 22. To be specific, the air chamber S1 directly or indirectly communicates with the main passage 11 (more specifically, the upstream passage 11a).

The oil chamber S2 stores the oil. A tank outlet passage 35 is connected to the oil chamber S2. The tank outlet passage 35 guides the oil, stored in the oil chamber S2, to the holding chamber 23. In the present embodiment, one of end portions of the tank outlet passage 35 is connected to the oil chamber S2, and the other end portion of the tank outlet passage 35 is connected to a portion of the bypass passage 22. In the present embodiment, a connection portion 22b of the bypass passage 22 is located downstream of a connection portion 22a of the bypass passage 22. The connection portion 22b is connected to the tank outlet passage 35, and the connection portion 22a is connected to the tank inlet passage 34.

The divider 32 is movable such that when the volume of the air chamber S1 increases, the volume of the oil chamber S2 decreases. In other words, the divider 32 is movable from a higher-pressure chamber out of the air chamber S1 and the oil chamber S2 to a lower-pressure chamber by a pressure difference between the air chamber S1 and the oil chamber S2. The divider 32 is comprised of, for example, a piston.

The switching mechanism 40 permits or blocks the communication between the holding chamber 23 and the oil tank 30, the communication between the holding chamber 23 and the upstream passage 11a, and the communication between the holding chamber 23 and the downstream passage 11b. In the present description and the claims, "permit the communication between the holding chamber and the oil tank" denotes that the supply of the oil from the oil tank to the holding chamber is permitted. To be specific, in the present description, "permit the communication between the holding chamber 23 and the oil tank 30" denotes that the communication between the holding chamber 23 and the oil chamber S2 is permitted, and does not denote that the communication between the holding chamber 23 and the air chamber S1 is permitted.

In the present embodiment, the switching mechanism 40 includes the first control valve 41 and the second control valve 42. The first control valve 41 and the second control valve 42 are electrically driven valves controlled by the controller 50.

The first control valve 41 is disposed at the bypass passage 22. The second control valve 42 is disposed at a portion of the bypass passage 22 which portion is located downstream of the first control valve 41. Specifically, the second control valve 42 is disposed at the connection portion 22b connected to the tank outlet passage 35. Moreover, the first control valve 41 is disposed at a portion of the bypass passage 22 which portion is located between the connection portions 22a and 22b.

As described above, the holding chamber 23 is a portion of the bypass passage 22 which portion is located between the first control valve 41 and the second control valve 42. In other words, the holding chamber 23 is formed as a space that can be sealed by the switching mechanism 40 (in the present embodiment, the first control valve 41 and the second control valve 42).

The first control valve 41 permits or blocks the communication between the holding chamber 23 and the upstream passage 11a. The first control valve 41 is, for example, a two-port electromagnetic valve. The second control valve 42 is a three-way valve that permits or blocks the communication between the holding chamber 23 and the downstream passage 11b and the communication between the holding chamber 23 and the oil tank 30. The second control valve 42 is, for example, a three-port electromagnetic valve.

The controller 50 controls the first control valve 41 and the second control valve 42 in the switching mechanism 40. The controller 50 controls the first control valve 41 and the second control valve 42 such that the state of the first control valve 41 and the state of the second control valve 42 are switched in a predetermined order. With this, the oil supply device 20A can supply a predetermined amount of oil per unit time to the main passage 11. Hereinafter, a method of controlling the switching mechanism 40 by the controller 50 will be described.

First, the controller 50 controls the switching mechanism 40 to realize a first state where the communication between the holding chamber 23 and the oil tank 30 is blocked, the communication between the holding chamber 23 and the upstream passage 11a is blocked, and the communication between the holding chamber 23 and the downstream passage 11b is permitted. To be specific, the first control valve 41 blocks the communication between the holding chamber 23 and the upstream passage 11a, and the second control valve 42 blocks the communication between the holding chamber 23 and the oil tank 30 and permits the communication between the holding chamber 23 and the downstream passage 11b.

When the switching mechanism 40 is in the first state, the holding chamber 23 communicates with the downstream passage 11b. Therefore, the pressure in the holding chamber 23 becomes equal to the pressure in the downstream passage 11b which has been reduced in pressure by the pressure reducer 21. Moreover, when the switching mechanism 40 is in the first state, the tank outlet passage 35 is closed by the second control valve 42, and therefore, the oil cannot be discharged from the oil chamber S2. On this account, in the casing 31, the divider 32 of the oil tank 30 stops at a position where force of pushing the divider 32 by the compressed air in the air chamber S1 and force of pushing the divider 32 by the oil in the oil chamber S2 are balanced.

Next, the controller 50 controls the switching mechanism 40 to realize a second state where the communication between the holding chamber 23 and the oil tank 30 is permitted, the communication between the holding chamber 23 and the upstream passage 11a is blocked, and the communication between the holding chamber 23 and the downstream passage 11b is blocked. To be specific, the first control valve 41 keeps on blocking the communication between the holding chamber 23 and the upstream passage 11a, and the second control valve 42 permits the communication between the holding chamber 23 and the oil tank 30 and blocks the communication between the holding chamber 23 and the downstream passage 11b.

With this, a part of the oil in the oil tank 30 flows into the holding chamber 23 which has been reduced in pressure when the switching mechanism 40 is in the first state. More specifically, the pressure in the holding chamber 23 (i.e., the pressure in the downstream passage 11b) when the switching mechanism 40 is in the first state is lower than the pressure in the air chamber S1 (the pressure in the upstream passage 11a). Therefore, when the switching mechanism 40 switches from the first state to the second state, the divider 32 moves in such a direction that the volume of the oil chamber S2 decreases. Thus, the oil, the amount of which corresponds to the volume of the holding chamber 23, flows into the holding chamber 23.

Next, the controller 50 controls the switching mechanism 40 to realize a third state where the communication between the holding chamber 23 and the oil tank 30 is blocked, the communication between the holding chamber 23 and the upstream passage 11a is permitted, and the communication between the holding chamber 23 and the downstream passage 11b is permitted. To be specific, the first control valve 41 permits the communication between the holding chamber 23 and the upstream passage 11a, and the second control valve 42 blocks the communication between the holding chamber 23 and the oil tank 30 and permits the communication between the holding chamber 23 and the downstream passage 11b.

With this, the holding chamber 23 communicates with both the upstream passage 11a and the downstream passage 11b, and therefore, the compressed air supplied from the compressor 3 flows from the upstream passage 11a through the bypass passage 22 to the downstream passage 11b. At this time, the oil and the compressed air in the holding chamber 23 are mixed with each other to generate the oil mist, and the generated oil mist is supplied to the bearing 7 through the downstream passage 11b.

Then, the controller 50 controls the switching mechanism 40 such that the switching mechanism 40 switches from the third state to the first state. To be specific, the first control valve 41 blocks the communication between the holding chamber 23 and the upstream passage 11a, and the second control valve 42 blocks the communication between the holding chamber 23 and the oil tank 30 and keeps on permitting the communication between the holding chamber 23 and the downstream passage 11b.

With this, the controller 50 controls the switching mechanism 40 such that the switching mechanism 40 repeatedly switches to the first state, the second state, and the third state in this order at a fixed cycle.

As described above, according to the gas turbine engine 1 of the present embodiment, in a process in which the switching mechanism 40 switches from the first state to the third state, the oil, the amount of which corresponds to the volume of the holding chamber 23, is supplied to the main passage 11. Therefore, when the controller 50 repeatedly switches the state of the switching mechanism 40 at a fixed cycle, the amount of oil supplied to the bearing 7 can be maintained constant. For example, the amount of oil supplied per unit time to the bearing 7 can be changed by adjusting the cycle of the switching of the state of the switching mechanism 40 by the controller 50.

Moreover, in the present embodiment, when the switching mechanism 40 is in the first state, the pressure in the holding chamber 23 is equal to the pressure in the downstream passage 11b. Moreover, the pressure in the air chamber of the oil tank 30 is equal to the pressure in the upstream passage 11a by the tank inlet passage. Therefore, when the switching mechanism 40 switches to the second state, and the holding chamber 23 communicates with the oil tank 30, the oil in the oil chamber can be made to flow into the holding chamber 23 by the pressure difference between the upstream passage 11a and the downstream passage 11b. On this account, the configuration of supplying the oil from the oil tank 30 to the holding chamber 23 can be realized by simple configuration.

Moreover, in the present embodiment, since the second control valve 42 is the three-way valve, the switching mechanism 40 can be realized by a smaller number of valves.

Moreover, in the present embodiment, the bypass passage 22 is comprised of the pipe, and the holding chamber 23 is a portion of the pipe which portion is located between the first control valve 41 and the second control valve 42. Therefore, the holding chamber 23 can be realized by simple configuration.

Moreover, in the present embodiment, since the pressure reducer 21 is the check valve, the pressure in the downstream passage 11b can be reduced by smaller configuration than when a pressure reducing valve is adopted as the pressure reducer 21.

Hereinafter, modified examples showing variations of the oil supply device will be described. The same reference signs are used for the common or corresponding components in the above embodiment and the modified examples, and the repetition of the same explanation is avoided in the modified examples. Moreover, since the components of the gas turbine engine other than the oil supply device are the same as those in the above embodiment, the explanations thereof are omitted.

Modified Example 1

Figure 3:
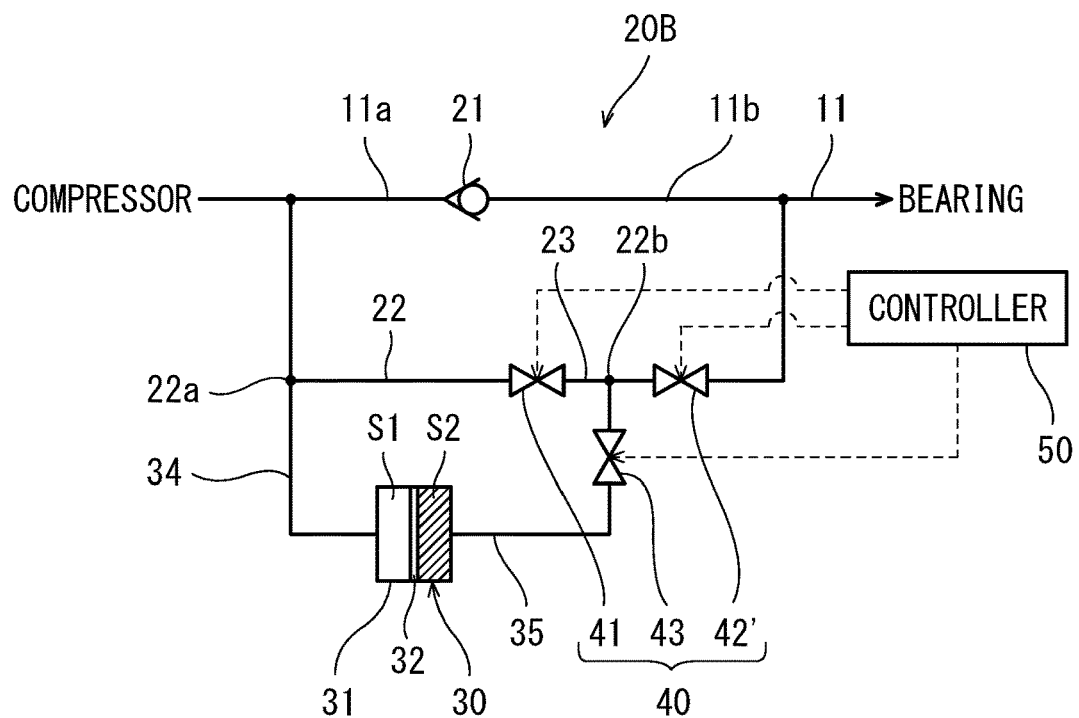
FIG. 3 is a schematic diagram of the oil supply device of Modified Example 1.

FIG. 3 is a schematic diagram of an oil supply device 20B of Modified Example 1. As shown in FIG. 3, in the oil supply device 20B, the switching mechanism 40 includes the first control valve 41, a second control valve 42', and a third control valve 43. The second control valve 42' is disposed at a portion of the bypass passage 22 which portion is located downstream of the connection portion 22b connected to the tank outlet passage 35. The third control valve 43 is disposed at the tank outlet passage 35.

In the present modified example, the holding chamber 23 is a space that can be sealed by the first control valve 41, the second control valve 42', and the third control valve 43. To be specific, in the present modified example, the holding chamber 23 is comprised of: a portion of the bypass passage 22 which portion is located between the first control valve 41 and the second control valve 42; and a portion of the tank outlet passage 35 which portion is located between the third control valve 43 and the connection portion 22b.

The second control valve 42' permits or blocks the communication between the holding chamber 23 and the downstream passage 11b but does not permit or block the communication between the holding chamber 23 and the oil tank 30. The second control valve 42' is, for example, a two-port electromagnetic valve.

The third control valve 43 is an electrically driven valve controlled by the controller 50. The third control valve 43 permits or blocks the communication between the holding chamber 23 and the oil tank 30. The third control valve 43 is, for example, a two-port electromagnetic valve.

The method of controlling the switching mechanism 40 by the controller 50 is the same as that of the above embodiment. To be specific, the controller 50 controls the first control valve 41, the second control valve 42', and the third control valve 43 in the switching mechanism 40 such that the switching mechanism 40 switches to the first state, the second state, and the third state in this order.

The present modified example can obtain the same effects as the above embodiment.

Modified Example 2

Figure 4:
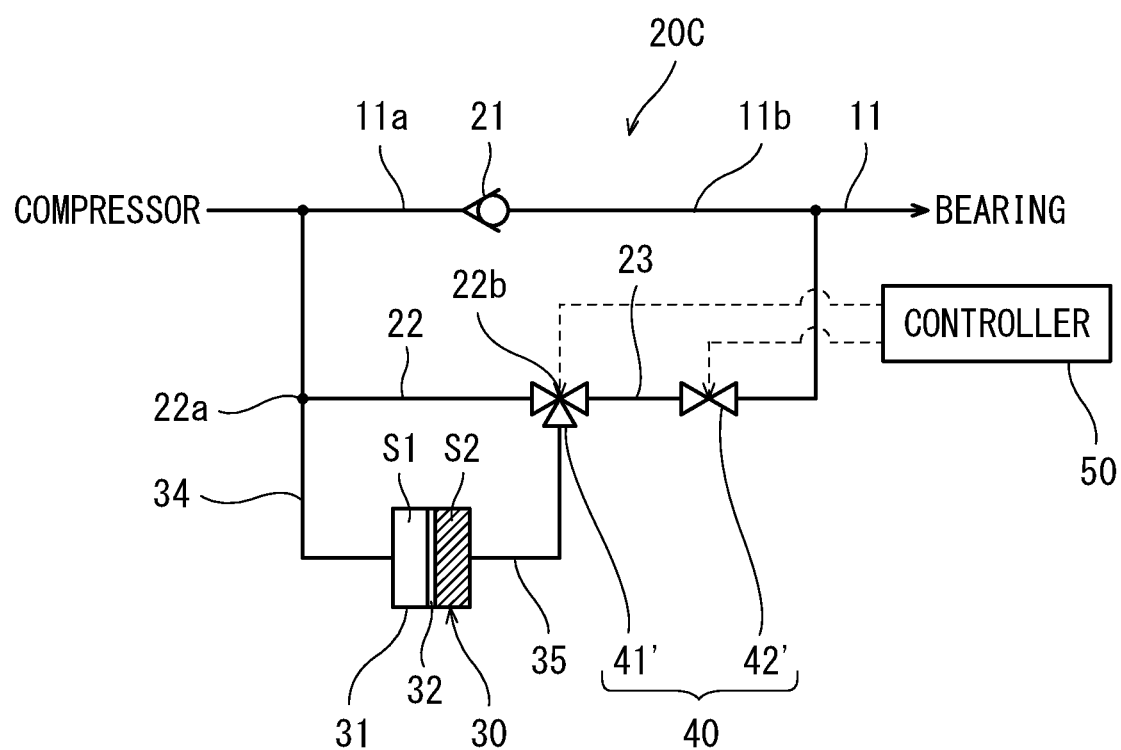
FIG. 4 is a schematic diagram of the oil supply device of Modified Example 2.

FIG. 4 is a schematic diagram of an oil supply device 20C of Modified Example 2. As shown in FIG. 4, in the oil supply device 20C, the switching mechanism 40 includes a first control valve 41' and the second control valve 42'. Since the second control valve 42' is the same in configuration as the second control valve 42' of Modified Example 1, the explanation thereof is omitted. The first control valve 41' is disposed at the connection portion 22a connected to the tank inlet passage 34.

In the present modified example, the holding chamber 23 is a space that can be sealed by the first control valve 41' and the second control valve 42'. To be specific, in the present modified example, the holding chamber 23 is comprised of a portion of the bypass passage 22 which portion is located between the first control valve 41' and the second control valve 42'.

The first control valve 41' is a three-way valve that permits or blocks the communication between the holding chamber 23 and the upstream passage 11a, and in addition, permits or blocks the communication between the holding chamber 23 and the oil tank 30. The first control valve 41' is, for example, a three-port electromagnetic valve.

The method of controlling the switching mechanism 40 by the controller 50 is the same as that of the above embodiment. To be specific, the controller 50 controls the first control valve 41' and the second control valve 42' in the switching mechanism 40 such that the switching mechanism 40 switches to the first state, the second state, and the third state in this order.

The present modified example can obtain the same effects as the above embodiment.

Other Embodiments

The present disclosure is not limited to the above embodiment, and various modifications may be made within the scope of the present disclosure.

For example, the components in the above embodiment and the modified examples may be suitably combined with each other.

Moreover, in the above embodiment, the check valve is adopted as the pressure reducer 21, but the pressure reducer 21 is not limited to this. For example, the pressure reducer 21 may be a pressure reducing valve or a restrictor.

Moreover, in the above embodiment, the holding chamber 23 is comprised of a portion of the bypass passage, i.e., the pipe which portion is located between the first control valve and the second control valve. However, the configuration of the holding chamber 23 is not limited to this. For example, the holding chamber 23 may include a container or the like.

Moreover, the configuration of the oil tank 30 is not limited to the configuration described in the above embodiment. For example, the divider 32 in the oil tank 30 may be comprised of, for example, a soft bag-shaped member.

Moreover, the air chamber S1 in the oil tank 30 does not have to communicate with the main passage 11. To be specific, the divider 32 in the oil tank 30 may move in such a direction that the volume of the oil chamber S2 decreases when the switching mechanism 40 switches from the first state to the second state. For example, a high-pressure air tank may be connected to the air chamber S1 through an on-off valve. The compressed air supplied from the upstream passage 11a may be supplied to the high-pressure air tank, or high-pressure air may be supplied from another high-pressure air source to the high-pressure air tank. Moreover, for example, the oil tank 30 may include a spring that biases the divider 32 in such a direction that the volume of the oil chamber S2 decreases. The oil tank 30 does not have to include the air chamber S1. In this case, the divider 32 may separate the oil chamber S2 from an external space of the casing 31.

The invention claimed is:

1. A gas turbine engine in which a compressor, a combustor, and a turbine are arranged so as to be lined up along a rotating shaft,
the gas turbine engine comprising:
a casing accommodating the compressor, the combustor, and the turbine;
a bearing arranged inside the casing;
a main passage through which compressed air extracted from the compressor is guided to the bearing; and
an oil supply device that includes an oil tank storing oil and supplies the oil to the main passage through which the compressed air flows to generate oil mist, wherein:
the oil supply device includes
a pressure reducer that is disposed at the main passage and makes pressure in a downstream passage of the main passage lower than pressure in an upstream passage of the main passage, the downstream passage being a portion located downstream of the pressure reducer, the upstream passage being a portion located upstream of the pressure reducer,
a bypass passage that bypasses the pressure reducer and connects the upstream passage and the downstream passage,
a holding chamber disposed at the bypass passage and having a predetermined volume,
a switching mechanism that permits or blocks communication between the holding chamber and the oil tank, communication between the holding chamber and the upstream passage, and communication between the holding chamber and the downstream passage, and
a controller that controls the switching mechanism; and
the controller controls the switching mechanism such that the switching mechanism switches to a first state, a second state, and a third state in this order,
the first state being a state where the communication between the holding chamber and the oil tank is blocked, the communication between the holding chamber and the upstream passage is blocked, and the communication between the holding chamber and the downstream passage is permitted,
the second state being a state where the communication between the holding chamber and the oil tank is permitted, the communication between the holding chamber and the upstream passage is blocked, and the communication between the holding chamber and the downstream passage is blocked,
the third state being a state where the communication between the holding chamber and the oil tank is blocked, the communication between the holding chamber and the upstream passage is permitted, and the communication between the holding chamber and the downstream passage is permitted.

2. The gas turbine engine according to claim 1, wherein:
the oil tank includes
an oil chamber that stores the oil,
an air chamber that communicates with the main passage, and
a divider that separates the oil chamber from the air chamber and is movable such that a volume of the oil chamber decreases when a volume of the air chamber increases; and
the oil supply device further includes a tank inlet passage through which a part of the compressed air flowing through the upstream passage is guided to the air chamber.

3. The gas turbine engine according to claim 1, wherein:
the switching mechanism includes
a first control valve that is disposed at the bypass passage and permits or blocks at least the communication between the holding chamber and the upstream passage and
a second control valve that is disposed at a portion of the bypass passage which portion is located downstream of the first control valve and permits or blocks at least the communication between the holding chamber and the downstream passage; and
the first control valve or the second control valve is a three-way valve that permits or blocks the communication between the holding chamber and the upstream passage or between the holding chamber and the downstream passage, and in addition, permits or blocks the communication between the holding chamber and the oil tank.

4. The gas turbine engine according to claim 3, wherein:
the bypass passage is comprised of a pipe; and
the holding chamber is a portion of the pipe which portion is located between the first control valve and the second control valve.

5. The gas turbine engine according to claim 1, wherein the pressure reducer is a check valve that prevents the compressed air from flowing from the downstream passage to the upstream passage.

* * * * *